Sept. 22, 1936.　　　　T. MADSEN　　　　2,055,153

PISTON PACKING RING IN SECTORS

Filed Nov. 8, 1934　　　　3 Sheets-Sheet 1

Inventor:
Tage Madsen
By E. F. Wenderoth
Atty

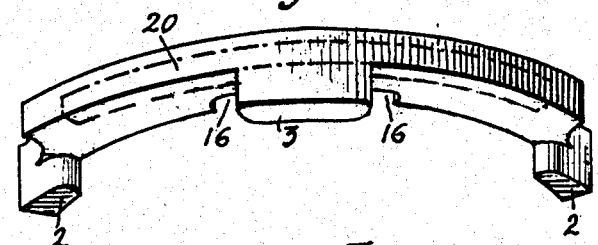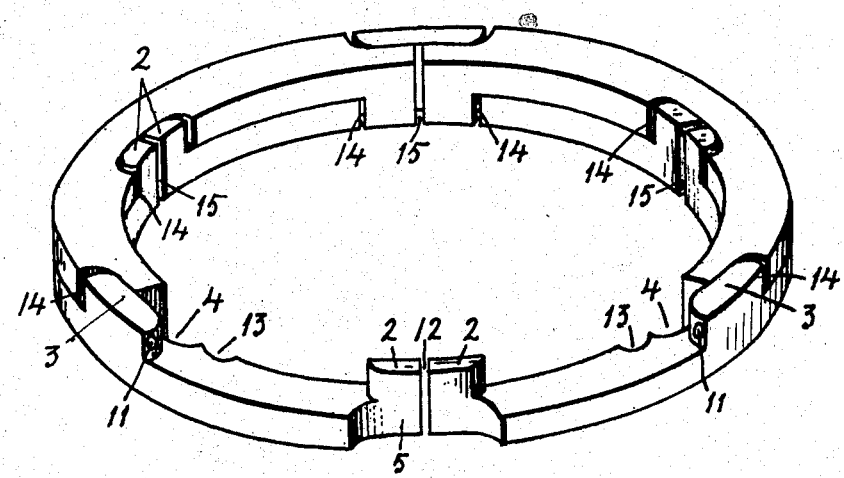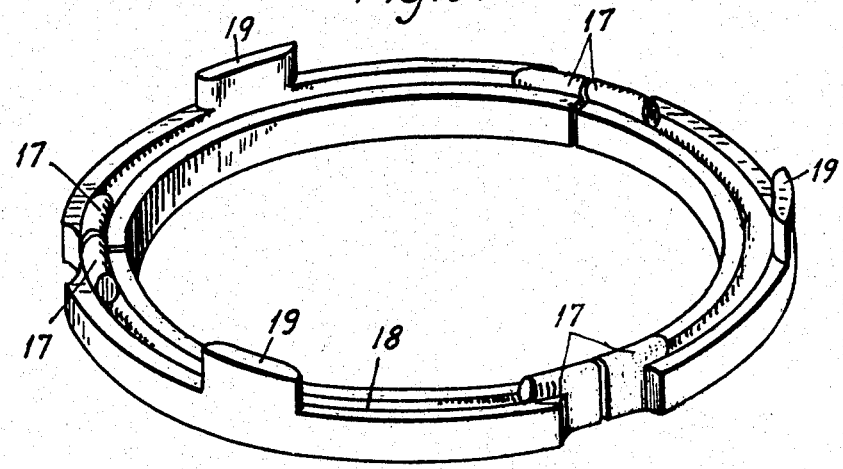

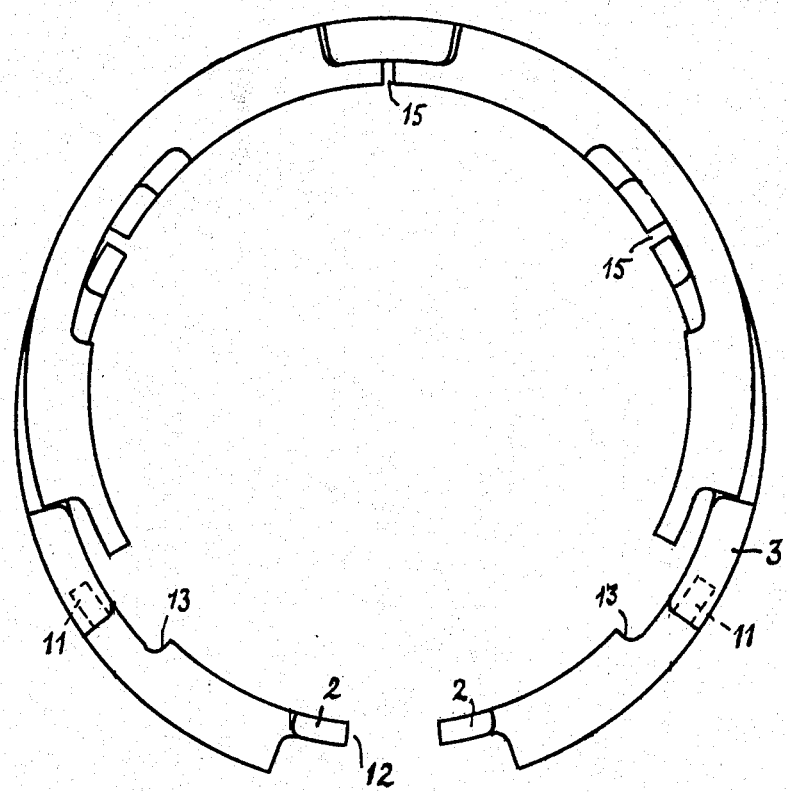
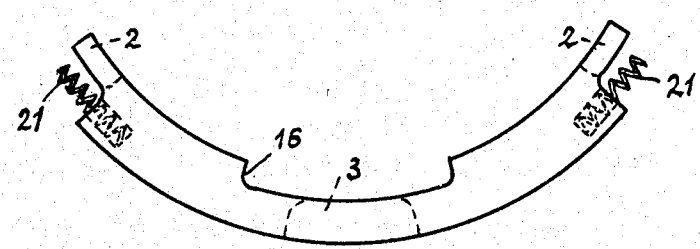

Patented Sept. 22, 1936

2,055,153

UNITED STATES PATENT OFFICE 2,055,153

PISTON PACKING RING IN SECTORS

Tage Madsen, Goteborg, Sweden

Application November 8, 1934, Serial No. 752,159
In Sweden November 8, 1933

5 Claims. (Cl. 309—29)

My invention relates to piston packing rings and more particularly to metallic packing rings for pistons and piston rods of combustion motors, steam engines and the like.

One object of my invention is to provide means for easily assembling the different parts of a piston rod packing and exchange them without the trouble of demounting the complete piston with its rod from the cylinder of the engine. To this end my packing ring is composed of several sectors so formed and interengaged that each sector can be put in its proper place and also removed therefrom without the necessity of passing the ring axially upon the piston rod.

Another object of my invention is to provide a packing ring for pistons which consists of several sectors which can be kept in place by each other without using any other means such as split spring rings.

In order to make the invention clear I will refer to the accompanying drawings which show three different embodiments of the new packing ring.

Figure 1:
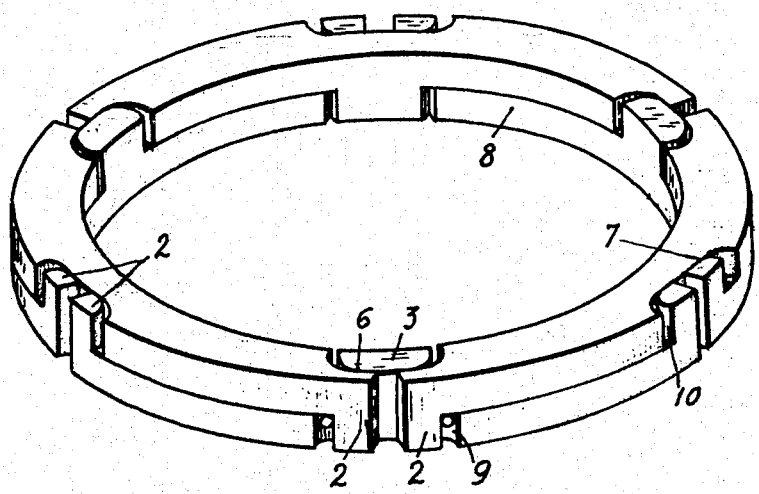
Figure 2:
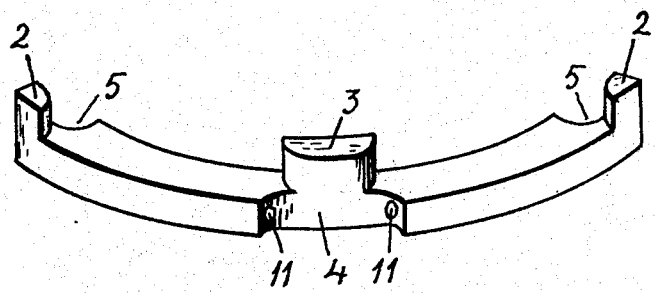

Fig. 1 shows a perspective view obliquely from above, of an inwardly contracting piston rod packing ring composed of six sectors, one of which is shown separately in Fig. 2. Fig. 3 shows a similar, but outwardly expanding packing ring for pistons, which ring is composed of six sectors, one of which is lifted out and shown separately in Fig. 4. Fig. 5 shows another example of only one of the two similar rings of the composed piston packing ring.

Figure 6 is a plan view of the ring shown in Figure 3 with a sector removed, and Figure 7 is a plan view of a sector of the construction shown in Figures 3 and 6.

In the rings shown all the sectors are exactly alike, which facilitates their making. Each sector is provided with two axial projections 2 at the ends and with an axial projection 3 in its middle. On the piston rod packing ring, shown in Fig. 1, the projections 2 are placed adjacent the outer edge of the ring and the projection 3 adjacent the inner edge. Corresponding to these projections a recess 4 in the middle of the sectors and recesses 5 at their ends are provided. When the ring is composed of six sectors six joints appear between their ends, which joints are covered by the projections 3, so that no gases may penetrate the ring radially, if the projections reach fully through the opposite sectors. If such complete covering of the joints is not wanted, then the projections can be made lower and the notches less deep. The projections and the notches are made to slide tightly against each other at 6 and 7 on cylindrical surfaces, co-axial with the ring's inner tightening and cylindrical surface 8. The surfaces mentioned may be conical or of any other shape, but the form first mentioned is the most convenient and simplest. The shown projections 2 and 3 are of the same thickness, and match in this respect half the thickness of the ring, but they may even be of different thickness, thinner or thicker than the half of the ring. Under certain conditions the sectors will thereby become unlike each other, which should be avoided in regard to their manufacture.

The ring described above can easily be placed into a packing box or round the piston rod and put together, without necessitating a removal of the piston rod entirely from the box. For the pressing and tightening of the ring against the piston rod circular spring rings may be used, which enclose the ring sectors. But such circular springs are naturally impossible or at least difficult to insert radially on the piston rod. Small press springs 21, shown in Fig. 7 are therefore preferred in the present case instead thereof, which press springs are fastened between the sectors at 9 or 10, e. g. in small cavities 11 or in special notches in the contact surfaces between the sectors.

In Figs. 3 and 4 the described ring is shown adapted as a piston ring, that is to say expanding outwardly, in which case the joints consequently must be arranged at the inside of the ring in order to be covered at the outside. This is done by the projections 2 being arranged at the inside of the ring and the projections 3 at the outside. For the outward pressing the springs are arranged at the ends of the projections 3, e. g. in the cavity 11 or between the projections 2 in the joint 12 or in special notches.

When this composed packing ring is used as a piston ring, it will fit more pliably to the cylinder wall of the piston engine than ordinary piston rings splitted at one point only. Furthermore these new rings are free from and independent of the inherent spring force of the ordinary piston rings, which may be different at different points around the ring, while in the new ring the tightening pressure against the cylinder wall will become more even. Further this pressure will remain practically alike even when the ring is worn out, because the coil springs in the cavities can be made so that they always exert practically the same force at least within the limits in question here. An ordinary piston ring, cut open at one point only, will on the contrary alter its pressure against the cylinder wall materially after longer use. A further advantage of the new ring is, that it may be made far thicker than the ordinary rings, that is: with a greater difference between its outer and inner diameters, as the ring does not need to be passed axially over the piston, but is put into place from the side piece by piece.

The mounting of the piston ring will not offer any difficulties, as far as the sectors, shown in Fig. 3, are concerned. When the last sector, shown in Fig. 4 and Fig. 7, has to be put into place, it may happen, that it cannot get into its proper position without making notches 13 in the nearest, underlying sectors to accommodate the projections 2. When the last sector is mounted, the ring must naturally be widened as much as the clearance spaces 14 between the projections and the notches will admit as shown in Fig. 6. The spaces 14 will then diminish and the joints 15 will be entirely opened. The joint 12 can be widened still more, so that the distance between the springs in the nearest cavities 11 becomes at least equal to the length of the sector. In this position the projections 2 of the sector in Fig. 7 can enter the notches 13, if only also the notches 16 are sufficiently long for the projections 2 of Fig. 6. Hereafter the ring is to be drawn together.

This ring tightens completely, so that a smaller number of these rings in the same piston do just as good or even better service than a larger number of ordinary piston rings.

The constructional form may be varied. This can be done for example by altering the position of the projections. In the case shown, which relates to a piston ring, the end projections 17 are drawn outwards and placed radially in the middle of the body of the ring. At the same time a groove 18 is made all around the ring between the projections 17 inside the middle projection 19. The three sectors shown constitute the lower ring of the packing ring only. Its upper ring is shaped exactly alike. When they are placed in position against each other the end projections 17 of the upper ring will fit into the groove 18 straight inside the nearest middle projection 19 on a distance from the end projections 17 of the lower ring. In order to perform the spring action helical press springs are placed in the grooves 18 between the end projections 17, which for that purpose are provided at the ends of the sectors, or in any other suitable way. If the ring is to be used as packing for a piston rod, the springs in the grooves 18 are arranged between the end projections 17 of the opposite sectors. The middle projections 19 may be placed at the inner or outer edge of the ring, according as the ring is used as piston ring or as piston rod ring.

On this account these rings can be made thicker than ordinary piston rings and are stiff, they can be lined with graphite or carbon, which may be put into grooves in the ring sectors' surfaces, which tighten against the cylinder wall or the piston rod respectively. These linings can be placed as shown at 20 in Fig. 4 with dotted lines and have a length of at least half the length of the sector, so that the lining in one sector meets the lining in the opposite sector, thus forming a continuous ring all around the packing.

I claim:—

1. In a packing ring for piston engines and composed of two complete rings each divided in sectors with the joints in one ring displaced in relation to the joints in the other component ring, each sector being provided with an axial projection at each end and an axial projection in about the centre of the sector, corresponding recesses being provided in the other component ring for said projections.

2. In a packing ring for piston engines and composed of two complete rings each divided in sectors with the joints in one ring displaced in relation to the joints in the other component ring, each sector being provided with an axial projection at each end adjacent one peripheral edge of the ring and an axial projection in about the centre of the sector adjacent the other peripheral edge of the ring, corresponding recesses being provided in the other component ring for said projections.

3. In a packing ring for piston engines and composed of two complete rings each divided in sectors with the joints in one ring displaced in relation to the joints in the other component ring, each sector being provided with an axial projection at each end and an axial projection in about the centre of the sector, corresponding recesses being provided in the other component ring for said projections and said projection in the centre of each sector being of such height that it covers the nearest joint.

4. In a packing ring for piston engines and composed of two complete rings each divided in sectors with the joints in one ring displaced in relation to the joints in the other component ring, each sector being provided with an axial projection at each end and an axial projection in about the centre of the sector, corresponding recesses being provided in the other component ring for said projections and springs being arranged between each end of the sectors in one ring and the adjacent sector of the other ring.

5. In a packing ring for piston engines and composed of two complete rings each divided in sectors with the joints in one ring displaced in relation to the joints in the other component ring, each sector being provided with an axial projection at each end and an axial projection in about the centre of the sector, corresponding recesses being provided in the other component ring for said projections and the working surface being provided with linings of carbon.

TAGE MADSEN.